United States Patent [19]
Baek et al.

[11] Patent Number: 5,798,845
[45] Date of Patent: Aug. 25, 1998

[54] METHOD FOR REGISTERING AND SELECTIVELY TRANSMITTING A MULTI-TERMINAL IDENTIFICATION OF A FACSIMILE SYSTEM

[75] Inventors: Nam-Dae Baek; Chan-Kook Yoon, both of Daegu, Rep. of Korea

[73] Assignee: SamSung Electronics Co., Ltd., Suwon, Rep. of Korea

[21] Appl. No.: 497,430

[22] Filed: Jun. 30, 1995

[30] Foreign Application Priority Data

Jun. 30, 1994 [KR] Rep. of Korea ............. 15543/1994

[51] Int. Cl.$^6$ ............. H04N 1/00; H04N 1/32; H04N 1/40; H04M 11/00
[52] U.S. Cl. ............. 358/434; 358/440; 358/402; 358/435; 358/436; 358/404; 358/442; 358/444; 379/100; 379/96; 379/355; 379/356
[58] Field of Search ............. 358/440, 434, 358/402, 468, 435, 436, 404, 442, 444; 379/100, 96, 355, 356

[56] References Cited

U.S. PATENT DOCUMENTS

| 4,811,111 | 3/1989 | Kurokawa | 379/100 |
|---|---|---|---|
| 4,870,503 | 9/1989 | Miura | 358/440 |
| 4,920,560 | 4/1990 | Kagayama | 379/100 |
| 4,956,860 | 9/1990 | Murata | 379/100 |
| 5,034,976 | 7/1991 | Sato | 379/113 |
| 5,134,653 | 7/1992 | Satomi et al. | 379/355 |
| 5,210,621 | 5/1993 | Kinoshita | 358/440 |
| 5,216,517 | 6/1993 | Kinoshita et al. | 358/440 |
| 5,384,836 | 1/1995 | Otsuka | 379/100 |
| 5,394,462 | 2/1995 | Maemura | 379/142 |

FOREIGN PATENT DOCUMENTS

60-248061  12/1985  Japan ............. H04N 1/00

*Primary Examiner*—Edward L. Coles, Sr.
*Assistant Examiner*—Tia M. Harris
*Attorney, Agent, or Firm*—Robert E. Bushnell, Esq.

[57] ABSTRACT

A method for registering a multi-terminal identification of a facsimile system and selectively transmitting the multi-terminal identification during a transmission mode. At a terminal identification register mode, a user's terminal number and a terminal identification are registered in a multi-terminal identification register table. At an automatic dialing data register mode, automatic dialing data and the terminal number are registered in an automatic dialing data register table. The terminal identification of the multi-terminal identification register table is selectively transmitted according to the received terminal number.

20 Claims, 5 Drawing Sheets

| TERMINAL NUMBER | TERMINAL ID | |
|---|---|---|
| | TELEPHONE NUMBER OF TRANSMITTING STATION | USER'S NAME |
| FF | 0546-460-2776 | BND S/W |
| 1 | 0546-460-2776 | BND H/W |
| 2 | 0546-460-2776 | PARK |
| 3 | 0546-460-2776 | SST |
| 4 | 0546-460-2776 | KIM |
| 5 | 0546-460-2776 | KBS H/W |
| ⋮ | ⋮ | ⋮ |

301 — (FF row)
302 — (rows 1-5...)

*FIG. 3*

| AUTOMATIC DIALING NUMBER | TELEPHONE NUMBER OF RECEIVING STATION | TERMINAL NUMBER |
|---|---|---|
| 01 | 0546-460-1234 | 1 |
| 02 | 02-745-1234 | FF |
| 03 | 0331-200-1234 | FF |
| 04 | 02-405-1234 | 5 |
| ⋮ | ⋮ | ⋮ |

METHOD FOR REGISTERING AND SELECTIVELY TRANSMITTING A MULTI-TERMINAL IDENTIFICATION OF A FACSIMILE SYSTEM

CROSS-REFERENCE TO RELATED APPLICATIONS

This application makes references to, incorporates the same herein, and claims all benefits incurring under 35 USC §119 from an application for Method For Registering And Selectively Transmitting A Multi-Terminal Identification Of A Facsimile System on 30 Jun. 1994 and assigned Ser. No. 15543/1994.

BACKGROUND OF THE INVENTION

1. Technical Field

The present invention relates to a facsimile system, and more particularly to a method for registering a multi-terminal identification (ID) of a facsimile system and selectively transmitting the multi-terminal ID during a transmission mode.

2. Background Art

Generally, a facsimile system is a single terminal device having a single transmission station. When the facsimile system is installed in either an office or at home, it often has to be shared by many people rather than only one person. Since the facsimile system normally has a single preset terminal identification (ID), when sending documents, a sender can automatically transmit the preset terminal ID together with a facsimile signal representing the documents so that the preset terminal ID could be printed at the top of the documents received by a receiver. Consequently, when using such a facsimile system having single terminal ID, it is difficult to distinguish different senders who send the documents from the transmission station to a receiver station. Accordingly, in order to effectively utilize the facsimile system, it is necessary for the facsimile system to be able to allow the sender to register his terminal ID so that the receiver can identify the sender by his terminal ID printed at the top of the received documents. Moreover, it is also necessary for the facsimile system to be able to allow different senders using the same facsimile system to register their respective terminal IDs so that the receiver can identify one particular sender from many who registered their names in the facsimile system. Further, it is also necessary for the facsimile system to be able to allow different senders using the same facsimile system to register their respective terminal IDs and link the registered terminal IDs with the automatic dialing features; that is, speed dialing such as for example, one-touch speed dialing and coded speed dialing which can advantageously be used in conjunction with different senders' terminal ID registration so that the facsimile number of different registered receiver stations could be speed-dialed, and at the same time, corresponding registered sender's terminal ID can be transmitted to the receiver station to be printed at the top of the received documents.

One example for a facsimile system capable of enabling a sender to automatically transmit the preset terminal ID to be printed at the top of the received documents is disclosed in U.S. Pat. No. 4,811,111 for Facsimile Machine Having A Function Of Transmitting Source And Destination Information issued to Kurokawa, and Japanese Kokai 60-248061 for System For Registering Destination And Sender Information issued to Matsunaga. Another example of a facsimile system capable of enabling automatic speed dialing is discussed in U.S. Pat. No. 4,920,560 for Method Of Automatic Dialing And Automatic Dialing Device For Facsimile Apparatuses issued to Kagayama. In Kagayama '560, the automatic speed dialing function is performed even if the sender does not monitor the facsimile process and the receiver station does not respond to the automatic dialing, so that communication could be reliably established.

Normally, both the terminal identification feature and the automatic speed dialing feature are available in the art. Such features can be found in the facsimile FAX-L770 produced by Canon Inc. For example, in the FAX-L770, the facsimile system is provided with the ability to allow a sender to send documents with his/her name or the company name, facsimile number, and the date and time printed at the top of the documents received by the receiver station. In addition, Canon facsimile also offers the sender different speed dialing features, such as one-touch speed dialing which allows the sender to dial a facsimile number at the press of a key. Before using the automatic dialing features, the sender is required to register the facsimile numbers with the FAX-L770 and assign the registered facsimile numbers with corresponding automatic dialing numbers so that the sender could eventually automatically dial a facsimile number at the press of a speed dialing key. Although such conventional facsimile system such as the FAX-L770 offers the user both the terminal identification and the automatic speed dialing features, we have observed that such conventional facsimile system does not offer the user the flexibility, simplicity and option of the automatic speed dialing feature used in conjunction with the multi-terminal identification feature; that is, the conventional facsimile system does not allow the user to optionally use the automatic speed dialing function and have different designated programmed terminal identification representing either the company name or different sender's name printed at the top of the received documents.

SUMMARY OF THE INVENTION

Accordingly, it is therefore an object of the invention to provide a method for processing a multi-terminal identification of a transmission station in a facsimile system.

It is another object of the invention to provide a method for registering a user's multi-terminal identification subscribed to a single transmission station in a facsimile system.

It is yet another object of the invention to provide a method for registering automatic dialing data together with a multi-terminal identification registered in a multi-terminal identification register table and selectively transmitting the multi-terminal identification during a transmission mode.

To achieve these and other objectives according to the principles of the present invention, a user's terminal number and a terminal identification are registered in a multi-terminal identification register table when a facsimile system is in a terminal identification register mode. At an automatic dialing data register mode, automatic dialing data and the terminal number are registered in an automatic dialing data register table. At a transmission mode, the terminal identification registered in the multi-terminal identification register table corresponding to the received terminal number is selectively transmitted so that the user's unique terminal identification can be printed on a received document at a receiving facsimile system.

The present invention also contemplates on a novel process for registering and selectively transmitting a multi-terminal identification in a facsimile system having a multi-terminal identification register table and an automatic dialing data register table comprising the steps of: (a)

registering a user's terminal number and a terminal identification in the multi-terminal identification register table during a terminal identification register mode; (b) registering automatic dialing data and the user's terminal number in the automatic dialing data register table during an automatic dialing data register mode; and (c) accessing the user's terminal number registered in the automatic dialing data register table corresponding to the automatic dialing data and simultaneously accessing the terminal identification registered in the multi-terminal identification register table corresponding to the accessed user's terminal number so that the facsimile system could transmit the user's unique terminal identification to be printed on a received document at a receiving facsimile system when the user dials the automatic dialing number that corresponds to the user's terminal number to establish communication between the facsimile system and the receiving facsimile system.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following description, numerous specific details such as facsimile numbers, users' names, the order of key inputs, etc. are set forth to provide a more through understanding of the invention. It will be apparent, however, to one skilled in the art that the invention may be practiced without these specific details.

Figure 1:
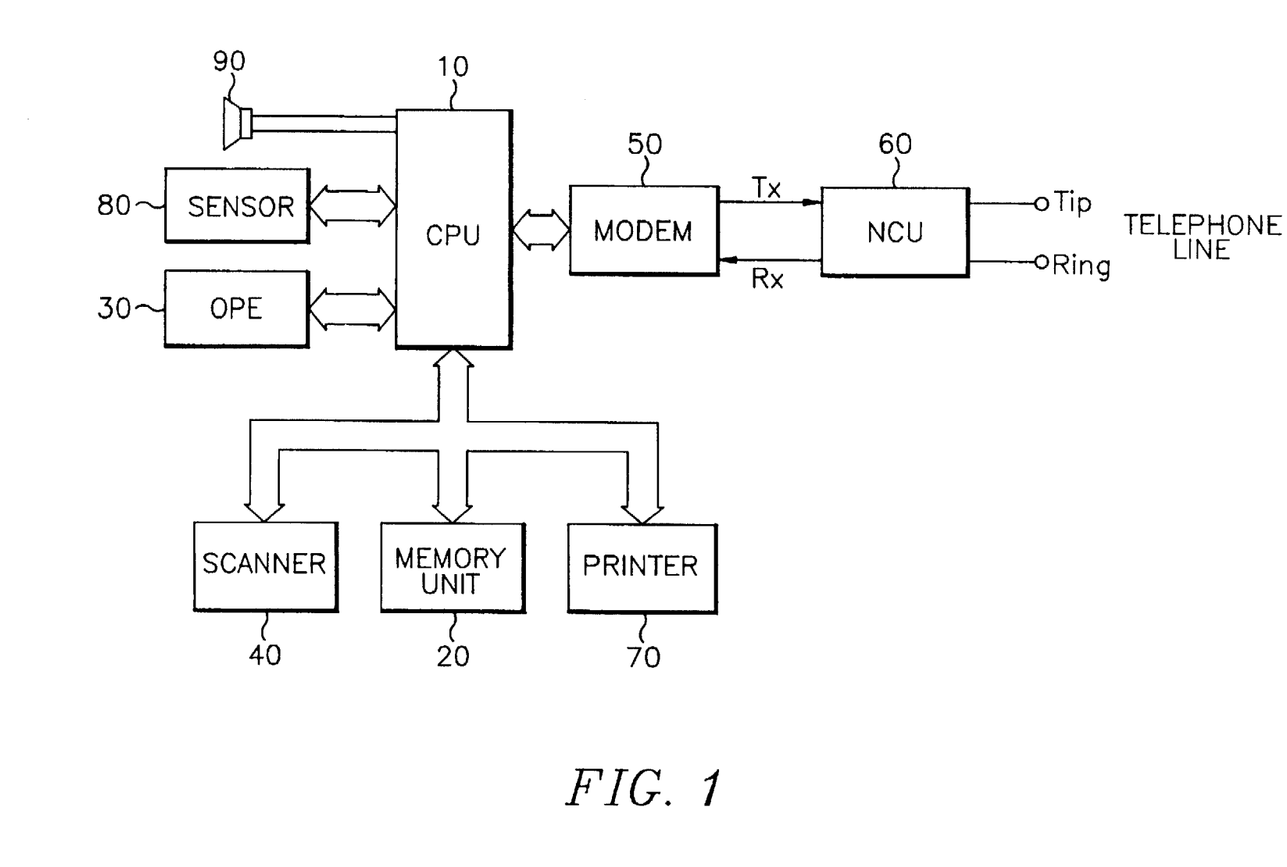
FIG. 1 illustrates a schematic construction of a facsimile system.

Referring to FIG. 1, a central processing unit (CPU) 10 controls a facsimile system according to a prescribed program. A memory unit 20 is accessed by the CPU 10 and has a program memory and a data memory. The program memory stores a program according to the present invention. The data memory temporarily stores data generated during program execution and includes a multi-terminal identification (ID) register table and an automatic dialing data register table. An operation panel (OPE) 30 has a key pad including mode setting keys and numeric keys and a display unit for providing a visual display of an operating state of the facsimile system under the control of the CPU 10. Upon operation, the key pad transmits key data entered by the user to the CPU 10. A scanner 40 scans a document, converts the scanned document into image data and transmits the image data to the CPU 10. A modulator-demodulator (MODEM) 50 modulates transmitted data to an analog signal and simultaneously demodulates the received analog signal to digital data under the control of the CPU 10. A network control unit (NCU) 60 controls the communication loop between the facsimile system and a telephone line and simultaneously interfaces a facsimile signal between the MODEM 50 and the telephone line under the control of the CPU 10. A printer 70 prints the image data under the control of the CPU 10. A sensor 80 senses the end of the document and informs the CPU 10 to either stop scanning the document to be transmitted to a receiving facsimile system via the telephone line or stop printing the document received from another facsimile system via the telephone line. A buzzer 90 generates an alarm signal under the control of the CPU 10 to alert the facsimile system that the fax has been completed.

The mode setting keys of the key pad of the operating panel 30 include a common terminal register mode key, a multi-terminal register mode key for setting a terminal identification (ID) register mode, an automatic dialing mode key for setting an automatic dialing function, and a transmission mode key for setting a transmission mode. The multi-terminal ID register table in the data memory of the memory unit 20 registers a multi-terminal ID, and the automatic dialing data register table therein registers automatic dialing data together with the multi-terminal ID.

Figure 2:
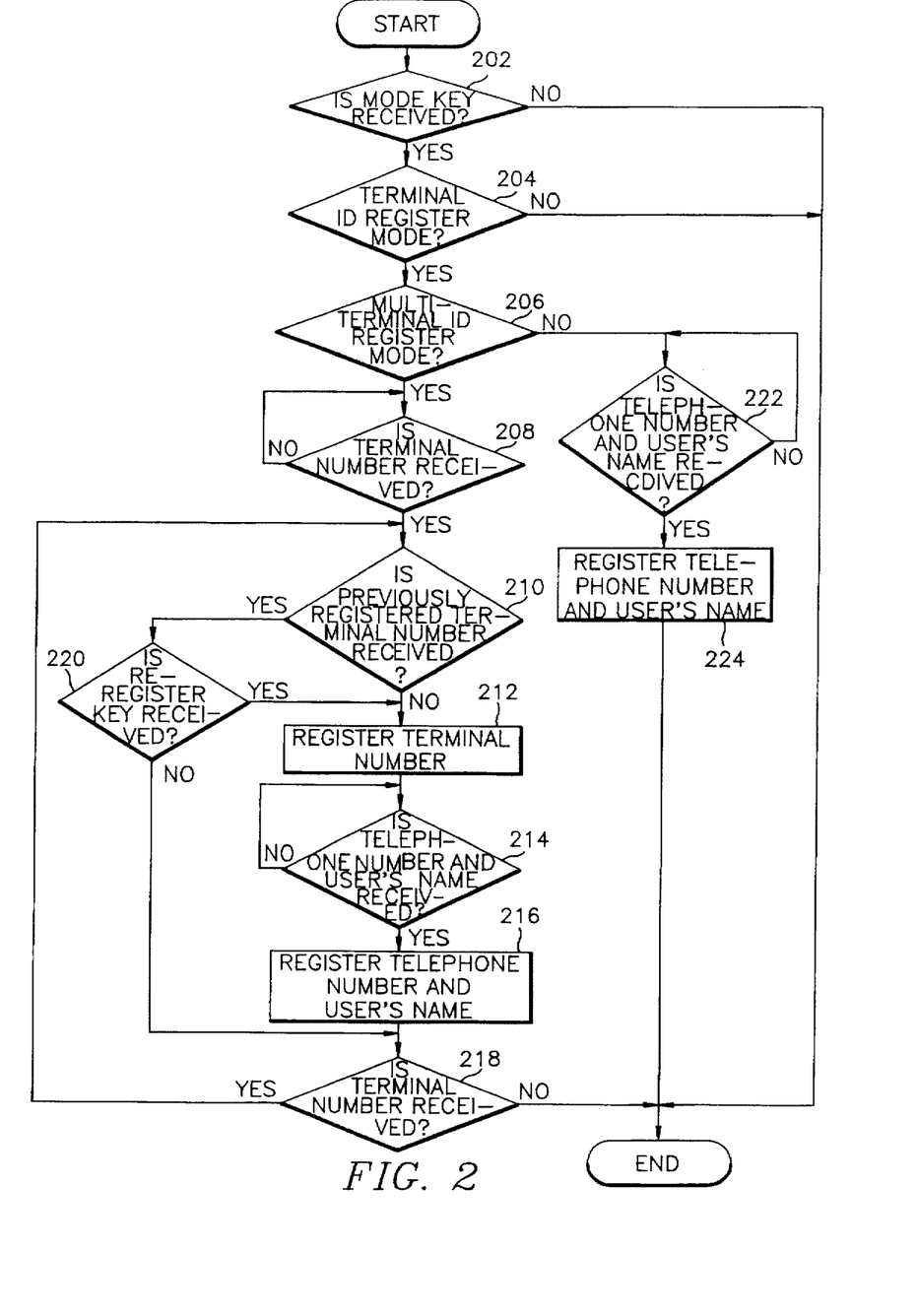
FIG. 2 is a flow chart illustrating a process for registering multi-terminal IDs of a facsimile system according to the present invention.
Figure 3:
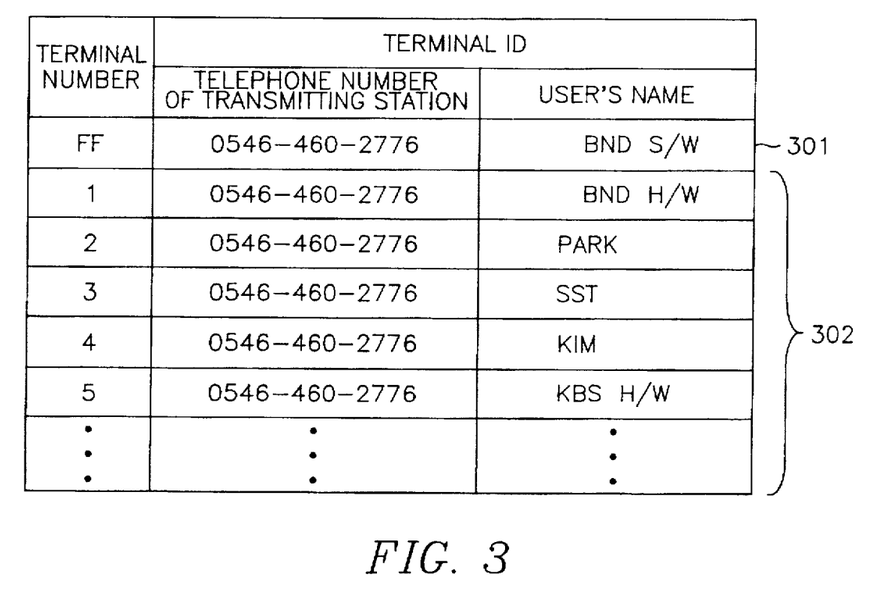
FIG. 3 illustrates a multi-terminal ID register table storing different terminal numbers corresponding to different user's name as registered by the multi-terminal ID registering process of FIG. 2.
Figure 4:
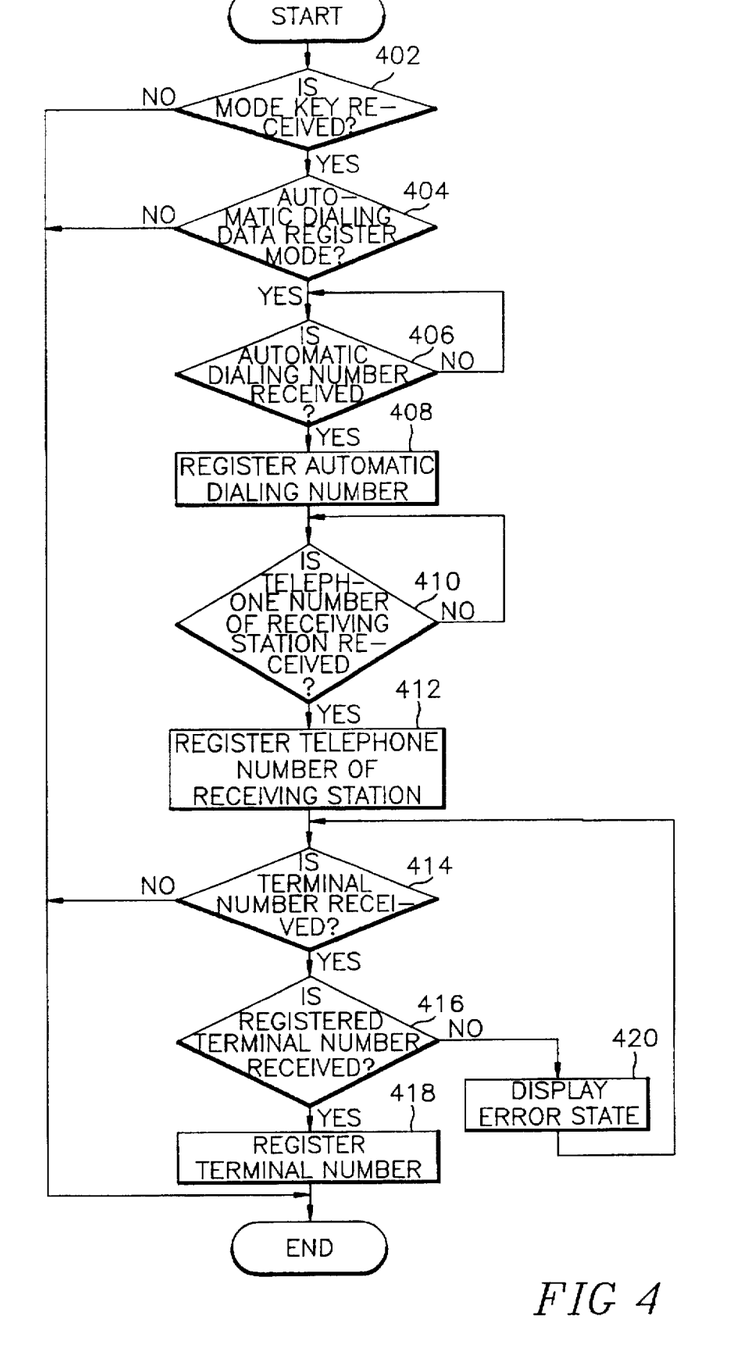
FIG. 4 is a flow chart illustrating a process for registering automatic dialing data of a facsimile system according to the present invention.
Figure 5:
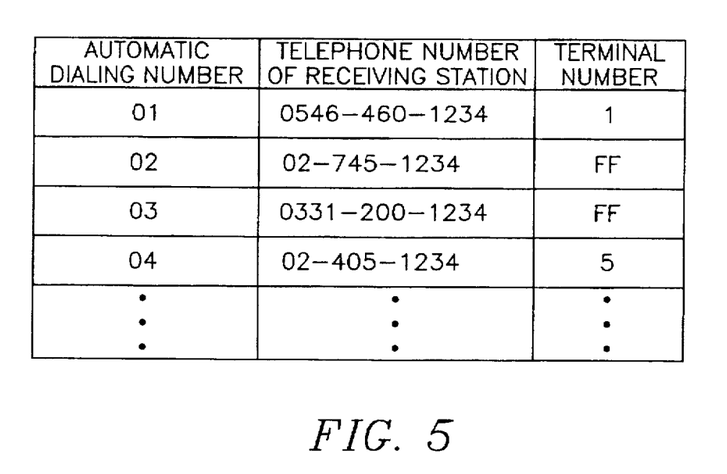
FIG. 5 illustrates an automatic dialing data register table storing automatic dialing numbers with corresponding different terminal numbers as registered by the automatic dialing data registering process of FIG. 4.
Figure 6:
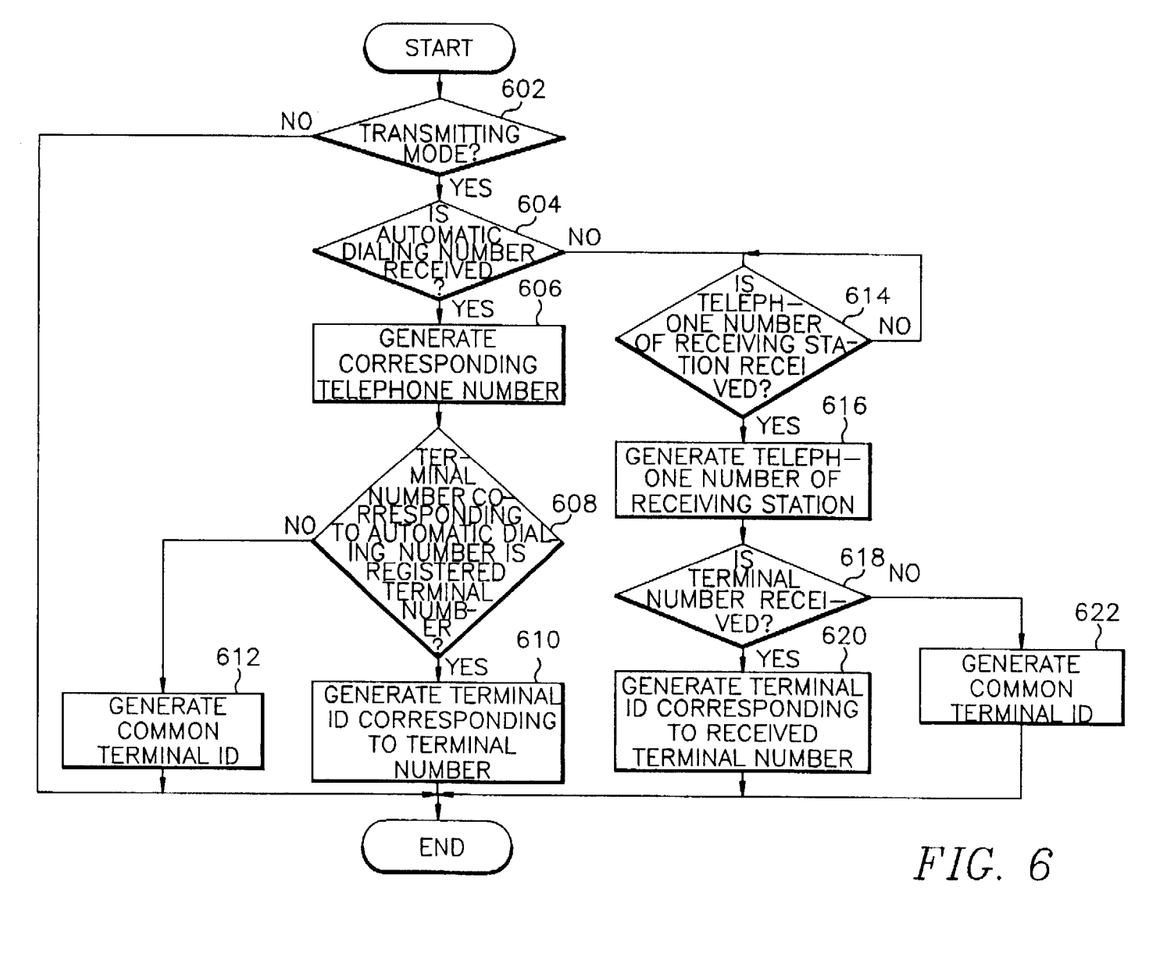
FIG. 6 is a flow chart illustrating an automatic speed dialing and a direct sending of a document in a facsimile system during a transmission mode according to the present invention.

In order for many users to individually use the facsimile system of a single transmission station, a multi-terminal ID registering program shown in FIG. 2 of the present invention is required. In this sequence, if a terminal ID register mode is set, a user's terminal number, a facsimile number of the transmission station and a user's name are individually registered in the multi-terminal ID register table as shown in FIG. 3. The automatic dialing function may be used for the most frequently used facsimile numbers. The automatic dialing function allows the user to dial a user-designated facsimile number by either one-touch speed dialing, coded-speed dialing, etc. Normally, the quickest way for the user to dial the most frequently used facsimile numbers is to employ an automatic dialing data registering program as shown in FIG. 4. In FIG. 4, when an automatic dialing register mode is set, the user's terminal number can be registered in an automatic dialing data register table as shown in FIG. 5 together with an automatic dialing number and a facsimile number of a receiving facsimile system. When a transmission function is executed when the multi-terminal ID register table and the automatic dialing data register table are provided, a transmission program as shown in FIG. 6 is used to selectively transmit a user's terminal ID.

A process for registering the multi-terminal ID will now be described with reference to FIGS. 2 and 3. In order to set the facsimile system in a terminal ID register mode, the user should depress either a common terminal register mode key or a multi-terminal register mode key through the key pad of the operating panel 30. If the common terminal register mode key is pressed by the user, the CPU 10 sets the facsimile system in a common terminal ID register mode. If, on the other hand, the multi-terminal register mode key is pressed by the user, the CPU 10 sets the facsimile system in a multi-terminal ID register mode. Accordingly, the registration process of FIGS. 2 and 3 of the present invention allows the user to register both the user's common name such as a common company name, and the user's unique name such as his/her name along with a facsimile number of the transmission station such that, upon transmission of the document through the telephone line, either the registered user's common name or the registered user's unique name can be printed at the top of the document received by a receiving facsimile station.

As shown in FIG. 2, when a mode key is input by the user, the CPU 10 responds to the mode key input at step 202, and determines whether the mode key input is a terminal ID register mode at step 204. If the mode key input is the terminal ID register mode, the CPU 10 next determines whether the terminal ID register mode is a multi-terminal ID register mode at step 206. If the terminal ID register mode is not the multi-terminal ID register mode however; that is, if the mode key input is a common terminal register mode key, the CPU 10 performs a common terminal ID registering operation. Therefore, the CPU 10 determines whether a key input is entered by the user at step 222. In order to register a common terminal ID at step 222, the user should depress a common terminal register mode key via the key pad of the operating panel 30, and then proceed to sequentially depress a facsimile number of the transmission station and the user's common name through a register key. Then the operating panel 30 transmits these data to the CPU 10 so as to sense the common terminal ID of the facsimile system. If the facsimile number of the transmission station and the user's common name are received at step 222, the CPU 10 registers at step 224 the common terminal ID in a first area 301 of the multi-terminal ID register table of the data memory stored in the memory unit 20 as shown in FIG. 3. Such a common terminal ID does not have an independent terminal number and an additional terminal number is not printed at the top of the document received by the receiving facsimile system.

If, on the other hand, the terminal ID register mode is the multi-terminal register mode; that is, if the multi-terminal ID register mode key is pressed through the operating panel 30, the CPU 10 executes a multi-terminal ID registering operation. The CPU 10 determines whether the terminal ID register mode is the multi-terminal ID register mode at step 206, and checks whether there is a key input at step 208. In order to register a multi-terminal ID, the user should first register a terminal number to be individually used through the register key located in the operating panel 30. If the register key is pressed from the operating panel 30, the CPU 10 regards key data entered by the register key as the terminal number.

When the terminal number is entered by the user and received by the CPU 10, the CPU 10 determines at step 210 whether the currently received terminal number is a previously registered terminal number. Such determination is made by checking a terminal number area in a second area 302 of the multi-terminal ID register table shown in FIG. 3. If the received terminal number is a new terminal number which has not been registered, the new terminal number is registered in the terminal number area of the multi-terminal ID register table at step 212. In order to register the multi-terminal ID, the user should sequentially depress a facsimile number of the transmission station, and the user's unique name through the register key after the terminal number has been registered. Then the operating panel 30 transmits these data to the CPU 10. The CPU 10 determines at step 214 whether the facsimile number of the transmission station and the user's name which represent the multi-terminal ID corresponding to a preset terminal number are received. At step 216, the CPU 10 proceeds to register the multi-terminal ID corresponding to the preset terminal number in the second area 302 of the multi-terminal ID register table of the data memory of the memory unit 20. The CPU 10 then checks the key pad of the operating panel 30 at step 218 to determine whether another terminal number is entered by the user. If another terminal number is entered by the user and received by the CPU 10, the CPU 10 returns to step 210 to repeat the above-described procedure, and if not, the terminal ID registering operation is completed. According to the registration process of the present invention, the user can register a common name and as many unique names as necessary, and each name can contain normally up 16 characters.

Further, the terminal ID registered in the multi-terminal ID register table can be altered, if the user depresses a re-register key when the facsimile system is in the multi-terminal ID register mode so as to enter a new terminal ID over the old terminal number previously registered in the multi-terminal ID register table. The re-register key is generally a separate key different from the general register key. Therefore, the CPU 10 responds to the terminal number previously registered in the multi-terminal ID register table at step 210, and determines whether the re-register key is entered by the user at step 220. If the re-register key is not received by the CPU 10 at step 220, the CPU 10 proceeds to step 218. If the re-register key is received, step 220 is followed by step 212 to re-register the new terminal number in the multi-terminal ID register table. Thereafter, through steps 214 and 216, the desired facsimile number and the user's unique name corresponding to the received terminal number are registered in a terminal ID area of the multi-terminal ID register table.

Consequently, the common terminal ID shared by all users is registered in the first area 301 of the multi-terminal ID register table in the same way as a conventional terminal ID registering process. When registering the multi-terminal ID, the terminal number to be selected, facsimile number and user's name are registered in the second area 302 of the multi-terminal ID register table.

Turning now to FIGS. 4 and 5, a process for registering the automatic dialing data together with the registered terminal number will be discussed. In order to register the automatic dialing data, the user should first depress the automatic dialing data register mode key through the key pad of the operating panel 30. If the automatic dialing data register mode key is received, the CPU 10 sets the facsimile system in an automatic dialing data register mode. The user should then register an automatic dialing number, a facsimile number of the receiving station and a user's terminal number. In the preferred embodiment, when implementing the automatic dialing function, the user's unique terminal ID preset in the multi-terminal ID registering process can be also transmitted.

As shown in FIG. 4, the CPU 10 determines whether a mode key is received by scanning the key pad of the operating panel 30 at step 402. If the mode key is received, the CPU 10 determines next whether the mode key is the automatic dialing data register mode at step 404. If the mode key is the automatic dialing data register mode, the CPU 10 waits to receive the automatic dialing number entered by the user at step 406 through the register key. The received automatic dialing number is then registered in an automatic dialing number area of the automatic dialing data register table shown in FIG. 5. At step 410, the CPU 10 waits to receive the facsimile number of the receiving station entered by the user through the register key. The received facsimile number is then registered in a facsimile number area of the automatic dialing data register table at step 412.

When the facsimile number of the receiving station is registered, the CPU 10 determines whether the terminal number is received at step 414 through key input for a prescribed period of time and determines whether the received terminal number is the registered terminal number at step 416 by checking the terminal number area of the multi-terminal ID register table shown in FIG. 3. If the received terminal number is the registered terminal number, the received terminal number is registered in the terminal number area of the automatic dialing data register table at step 418. If the terminal number which has not been registered in the multi-terminal ID register table is received, the CPU 10 controls the operating panel 30 to display an error state and simultaneously controls the buzzer 90 to generate an alarm sound at step 420. Once the error state is displayed and the alarm sound is generated, the CPU 10 returns to step 414 to receive another terminal number.

If the user has not registered a user's ID, or if there is no need to transmit an additional ID, the CPU 10 does not need to return to step 414 to determine whether a next terminal number is received. Then, the automatic dialing data registering process is completed, an indication "FF" representing that the terminal number is no longer being registered appears on the terminal number area of the automatic dialing data register table.

A transmission operation under the state that the multi-terminal ID is registered will now be described with reference to FIG. 6. As shown in FIG. 5, if the user presses a transmission mode key so as to implement a transmission function of the facsimile system, the CPU 10 senses this at step 602 and waits to receive facsimile number data of the receiving station. At step 604, the CPU 10 determines whether the user dials the automatic dialing number which corresponds to the facsimile number of the receiving station registered previously in the automatic dialing data register table. If the user dials the automatic dialing number at the press of a key, the CPU 10 generates the facsimile number of the receiving station corresponding to the automatic dialing number registered in the automatic dialing data register table at step 606. At step 608, the CPU 10 then checks the terminal number region corresponding to the automatic dialing number registered in the automatic dialing data register table and determines whether the user's terminal number corresponding to the automatic dialing number is registered. If the user's terminal number corresponding to the automatic dialing number is the registered terminal number, the CPU 10 accesses the multi-terminal ID register table as shown in FIG. 3, and generates the facsimile number of the transmission station and the user's unique name corresponding to the registered terminal number at step 610 for transmission so that the facsimile number of the transmission station and the user's unique ID can be printed on the document received by the receiving station.

If, on the other hand, the user's terminal number corresponding to the automatic dialing number is "FF" indicating that the terminal number has not been registered in the terminal number area of the automatic dialing data register table, the CPU 10 accesses the multi-terminal ID register table as shown in FIG. 3, and generates the common terminal ID stored in the first area 301 of the multi-terminal ID register table at step 612 for transmission so that such facsimile number and user's common ID can be printed on the document received by the receiving station.

Therefore, during the automatic dialing data register mode, if the terminal number corresponding to the automatic dialing number of the automatic dialing data register table is the registered terminal number, the user's terminal ID corresponding to the terminal number of the multi-terminal ID register table is generated together with the facsimile number of the receiving station. If not, the common terminal ID registered in the first area 301 of the multi-terminal ID register table is generated together with the facsimile number of the receiving station.

If, however, the user does not dial the automatic dialing number, but directly dials a facsimile number of the receiving station, that is, if the automatic dialing number is not received, the CPU 10 determines whether the user dials a facsimile number of the receiving station at step 614. If so, the CPU 10 generates the received facsimile number of the receiving station at step 616. The CPU 10 then determines whether the terminal number is entered by the user at step 618. If the terminal number is entered by the user and is received within a prescribed period of time, the CPU 10 accesses the multi-terminal ID register table and generates the terminal ID corresponding to the received terminal number at step 620 so that the facsimile number of the transmission station and the user's unique ID corresponding to the received terminal number can be printed on the document received by the receiving station. If not, however, the CPU 10 accesses the multi-terminal ID register table and generates the common terminal ID at step 622 so that the facsimile number of the transmission station and the user's common ID can be printed on the document received by the receiving station.

As may be apparent from the above description, the multi-terminal ID can be registered and thus the user's unique ID can be selectively transmitted at the transmission mode. Accordingly, a facsimile system constructed according to the present invention advantageously offers the user the flexibility, simplicity and option of the automatic speed dialing feature used in conjunction with the multi-terminal identification feature. In other words, the facsimile system according to the present invention allows the user to optionally use the automatic speed dialing function and have different programmed terminal identification representing either the company name or different sender's name printed at the top of the received documents.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for registering and selectively transmitting a multi-terminal identification in a facsimile system, comprising the steps of:

setting said facsimile system in a multi-terminal identification registration mode upon depression of a multi-terminal registration mode key from an operation panel;

registering a terminal number in a memory;

registering a sender's terminal identification comprising a facsimile number of said facsimile system and the sender's unique identification corresponding to said terminal number registered in said memory, in said memory;

registering a facsimile number of a destination facsimile system and assigning the registered facsimile number of said destination facsimile system with an automatic dialing number corresponding to said terminal number registered in said memory, in said memory; and enabling printing of said sender's terminal identification corresponding to said terminal number on each discrete sheet of a printable medium reflecting a document at said destination facsimile system, when the sender dials said automatic dialing number for document transmission.

2. The method of claim 1, further comprised of said sender's unique identification including one of the sender's name and a company name distinct from said sender's name.

3. A method for registering and selectively transmitting a multi-terminal identification in a transmitting facsimile system having a memory comprising a multi-terminal identification registration table and an automatic dialing data registration table, said method comprising the steps of:

setting said transmitting facsimile system in a common terminal identification registration mode upon receipt of a common terminal registration mode key pressed by a user;

registering first key data representing a common terminal identification in said multi-terminal identification registration table after said transmitting facsimile system has been set in said common terminal identification registration mode;

setting said transmitting facsimile system in a multi-terminal identification registration mode upon receipt of a multi-terminal registration mode key pressed by the user;

registering second key data representing a terminal number in said multi-terminal identification registration table after said transmitting facsimile system has been set in said multi-terminal identification registration mode;

registering third key data representing a user's unique terminal identification in said multi-terminal identification registration table corresponding to said terminal number after said terminal number has been registered in said multi-terminal identification registration table; and registering fourth key data representing a facsimile number of a receiving facsimile system with an assigned automatic dialing number in said automatic dialing data registration table corresponding to said terminal number registered in said multi-terminal identification registration table;

said transmitting facsimile system enabling printing of said user's unique terminal identification on each discrete sheet of a printable medium reflecting a document at the receiving facsimile system when the user, during document transmission, selects said assigned automatic dialing number that corresponds to said terminal number registered in said multi-terminal identification registration table for establishing communication between said transmitting facsimile system and said receiving facsimile system, and alternatively enabling printing of said common terminal identification on each discrete sheet of said printable medium reflecting said document at the receiving facsimile system when the user, prior to document transmission, directly dials one of the facsimile number of the receiving facsimile system and the assigned automatic dialing number that does not correspond to said terminal number registered in said multi-terminal identification registration table for establishing communication between said transmitting facsimile system and said receiving facsimile system.

4. The method of claim 3, further comprised of said user's unique terminal identification including a facsimile number of said transmitting facsimile system and a user's name.

5. A method for registering and selectively transmitting a multi-terminal identification in a facsimile system having a multi-terminal identification registration table and an automatic dialing data registration table, said method comprising the steps of:

registering a user's terminal number and a terminal identification in said multi-terminal identification registration table during a terminal identification registration mode;

registering automatic dialing data and said user's terminal number in said automatic dialing data registration table during an automatic dialing data registration mode; and accessing said user's terminal number registered in said automatic dialing data registration table corresponding to said automatic dialing data, and simultaneously accessing and generating said terminal identification registered in said multi-terminal identification registration table corresponding to the accessed user's terminal number.

6. The method of claim 5, further comprised of said user's terminal number and said terminal identification being registered in said multi-terminal identification registration table by:

setting said facsimile system in a multi-terminal identification registration mode upon receipt of a multi-terminal registration mode key pressed by the user;

registering first key data representing said user's terminal number in said multi-terminal identification registration table after said facsimile system has been set in said multi-terminal identification registration mode; and registering second key data representing said terminal identification in said multi-terminal identification registration table corresponding to said user's terminal number.

7. The method of claim 6, further comprised of said terminal identification including a facsimile number of said facsimile system and the user's name.

8. The method of claim 7, further comprised of said automatic dialing data and said user's terminal number being registered in said automatic dialing data registration table by:

setting said facsimile system in an automatic dialing data registration mode upon receipt of an automatic dialing data registration mode key pressed by the user;

registering third key data representing automatic dialing data in said automatic dialing data registration table after said facsimile system has been set in said automatic dialing data registration mode; and registering fourth key data representing said terminal number registered in said multi-terminal identification registration table corresponding to said automatic dialing data in said automatic dialing data registration table.

9. The method of claim 8, further comprised of said automatic dialing data including an automatic dialing number assigned to speed dial a facsimile number of a receiving facsimile system, and said facsimile number of said receiving facsimile system.

10. The method of claim 9, further comprised of said user's terminal number registered in said automatic dialing data registration table and said terminal identification registered in said multi-terminal identification registration table being accessed by:

setting said facsimile system in a transmission mode for document transmission, when a transmission mode key is pressed by the user;

accessing said facsimile number of said receiving facsimile system and a corresponding terminal number registered in said automatic dialing data registration table, when the user speed dials said receiving facsimile system using said automatic dialing number during said transmission mode; and transmitting said terminal identification corresponding to the accessed terminal number to said receiving facsimile system.

11. A method for communication in a facsimile system, comprising the steps of:

registering a terminal number and a terminal identification in a multi-terminal identification registration table during a designated terminal identification registration mode;

registering automatic dialing data and said terminal number in an automatic dialing data registration table during an automatic dialing data registration mode; and accessing said terminal number registered in said automatic dialing data registration table corresponding to said automatic dialing data, and simultaneously accessing and generating said terminal identification registered in said multi-terminal identification registration table corresponding to the accessed terminal number.

12. The method of claim 11, further comprised of said terminal number and said terminal identification being registered in said multi-terminal identification registration table by:

setting said facsimile system in a common terminal identification registration mode, when a common terminal registration mode key from an operation panel is pressed by a user;

registering first key data representing a common terminal identification in said multi-terminal identification registration table, when said facsimile system is set in said common terminal identification registration mode;

setting said facsimile system in a multi-terminal identification registration mode, when a multi-terminal registration mode key from said operation panel is pressed by the user;

registering second key data representing said terminal number in said multi-terminal identification registration table, when said facsimile system is set in said multi-terminal identification registration mode; and registering third key data representing the user's unique terminal identification corresponding to said terminal number in said multi-terminal identification registration table.

13. The method of claim 12, further comprised of the user's unique terminal identification including a facsimile number of said facsimile system and the user's name.

14. The method of claim 13, further comprised of said automatic dialing data and said terminal number being registered in said automatic dialing data registration table by:

setting said facsimile system in an automatic dialing data registration mode upon receipt of an automatic dialing data registration mode key from said operation panel pressed by the user;

registering fourth key data representing automatic dialing data in said automatic dialing data registration table after said facsimile system has been set in said automatic dialing data registration mode;

checking whether fifth key data is received after said automatic dialing data is registered in said automatic dialing data registration table;

when said fifth key data is received after said automatic dialing data is registered, registering said fifth key data as a terminal number corresponding to said automatic dialing data; and when said fifth key data is not received after said automatic dialing data is registered, denying registration of said fifth key data as said terminal number corresponding to said automatic dialing data.

15. The method of claim 14, further comprised of said automatic dialing data including an automatic dialing number and a corresponding facsimile number of a destination facsimile system.

16. The method of claim 15, further comprised of said terminal number registered in said automatic dialing registration table and said terminal identification registered in said multi-terminal identification registration table being accessed by:

setting said facsimile system in a transmission mode upon receipt of a transmission mode key from said operational panel pressed by the user;

transmitting a facsimile number of said destination facsimile system of said automatic dialing data registration table corresponding to said automatic dialing number received after said transmission mode is set;

checking whether a terminal number corresponding to said automatic dialing number is a registered terminal number;

when said terminal number corresponds the registered terminal number, transmitting a user's unique terminal identification corresponding to said terminal number registered in a multi-terminal identification area of said multi-terminal identification registration table to said destination facsimile system; and when said terminal number does not correspond the registered terminal number, transmitting a common terminal identification registered in a common terminal identification area of said multi-terminal identification registration table to said destination facsimile system.

17. A method for registering and selectively transmitting a multi-terminal identification in a facsimile system having a multi-terminal identification registration table, said method comprising:

a terminal identification registration process comprising the steps of:

setting said facsimile system in a common terminal identification registration mode, when a common terminal registration mode key is depressed from an operation panel;

registering first key data received as a common terminal identification, after said common terminal identification registration mode is set, in a common terminal identification area of said multi-terminal identification registration table;

setting said facsimile system in a multi-terminal identification registration mode, when a multi-terminal registration mode key is depressed from said operation panel;

registering second key data received as a terminal number, after said multi-terminal identification registration mode is set, in a multi-terminal identification area of said multi-terminal identification registration table; and registering third key data received as a user's unique terminal identification corresponding to said terminal number, after said terminal number is registered in an area corresponding to said terminal number of said multi-terminal identification registration table; and a terminal identification transmission process comprising the steps of:

setting said facsimile system in a transmission mode, when a transmission mode key is depressed from said operation panel;

transmitting a facsimile number of a destination facsimile system, to said destination facsimile system, after said transmission mode is set;

checking whether tie terminal number is received, after said facsimile number of said destination facsimile system is transmitted to said destination facsimile system;

when said terminal number is received, transmitting the user's unique terminal identification corresponding to said terminal number registered in said multi-terminal identification area of said multi-terminal identification registration table to said destination facsimile system; and when said terminal number is not received, transmitting the common terminal identification registered in said common terminal identification area of said multi-terminal identification registration table to said destination facsimile system.

18. The method of claim 17, further comprised of said terminal identification including a facsimile number of said facsimile system and the user's name.

19. A facsimile device, comprising:

a key input unit including at least a common terminal identification registration mode key, a multi-terminal identification registration mode key, and an automatic dialing data registration mode key;

a memory containing a first table for registering a terminal number, a common terminal identification and a user's terminal identification corresponding to the terminal number, and a second table for registering an automatic dialing number associating with a facsimile number of a destination facsimile system and a corresponding terminal number; and controller means for permitting the user to register the common terminal identification in said first table response to input of said common identification registration mode key, to register the terminal number and the user's terminal identification in said first table in response to input of said multi-terminal identification registration mode key, and to register the automatic dialing number and the corresponding terminal number in said second table in response to input of said automatic dialing data registration mode key, said controller means further controlling transmission of the user's terminal identification corresponding to the terminal number registered in said first table to said destination facsimile system when the user dials the automatic dialing number that has the corresponding terminal number registered in said first table and said second table, and alternatively controlling transmission of the common terminal identification to said destination facsimile system when the user dials the automatic dialing number that has no corresponding terminal number registered in said first table and said second table.

20. The facsimile system of claim 19, further comprised of said user's terminal identification including a facsimile number of said facsimile system and a user's name.

* * * * *